(12) United States Patent
Yamada (10) Patent No.: US 9,994,248 B2
(45) Date of Patent: Jun. 12, 2018

(54) STEERING COLUMN DEVICE

(71) Applicant: NSK LTD., Shinagawa-ku, Tokyo (JP)

(72) Inventor: Jun Yamada, Maebashi (JP)

(73) Assignee: NSK LTD., Tokyo (JP)

( * ) Notice: Subject to any disclaimer, the term of this patent is extended or adjusted under 35 U.S.C. 154(b) by 0 days. days.

(21) Appl. No.: 15/520,504

(22) PCT Filed: Sep. 28, 2015

(86) PCT No.: PCT/JP2015/077247
§ 371 (c)(1),
(2) Date: Apr. 20, 2017

(87) PCT Pub. No.: WO2016/072170
PCT Pub. Date: May 12, 2016

(65) Prior Publication Data
US 2017/0313346 A1 Nov. 2, 2017

(30) Foreign Application Priority Data
Nov. 4, 2014 (JP) .................................. 2014-224243

(51) Int. Cl.
*B62D 1/19* (2006.01)
*B62D 1/189* (2006.01)
*B62D 1/184* (2006.01)

(52) U.S. Cl.
CPC ............. *B62D 1/195* (2013.01); *B62D 1/184* (2013.01); *B62D 1/189* (2013.01)

(58) Field of Classification Search
CPC .......... B62D 1/195; B62D 1/197; B62D 1/19; B62D 1/11; Y10S 248/90
See application file for complete search history.

(56) References Cited

U.S. PATENT DOCUMENTS

2003/0155760 A1* 8/2003 Laisement ............. B62D 1/195
 280/777
2006/0043722 A1* 3/2006 Hoshino ................ B62D 1/195
 280/777

(Continued)

FOREIGN PATENT DOCUMENTS

JP 56-25981 Y2 6/1981
JP 2580481 Y2 9/1998

(Continued)

OTHER PUBLICATIONS

Communication dated Dec. 22, 2015 issued by the International Searching Authority in counterpart International Application No. PCT/JP2015/077247 (PCT/ISA/210).

(Continued)

*Primary Examiner* — Keith J Frisby
(74) *Attorney, Agent, or Firm* — Sughrue Mion, PLLC (57) ABSTRACT

The release capsule includes a sleeve having a through-hole for inserting therein a fastening member configured to fix the vehicle body mounting bracket to the vehicle body and to be arranged in the notch groove, a sliding plate having a hole formed thereon, in which the sleeve is to be inserted, and configured to sandwich the vehicle body mounting bracket, and an fixing part and a lock member each provided at an end portion and the other end portion of the sleeve so as to sandwich the sliding plate and the vehicle body mounting bracket. The sleeve includes a male screw formed on a cylindrical part thereof. The male screw of the sleeve is configured to be screwed with a female screw formed at a round hole of the lock member. The sliding plate and the vehicle body mounting bracket are sandwiched by the fixing part and the lock member.

9 Claims, 8 Drawing Sheets (56) References Cited

U.S. PATENT DOCUMENTS

| | | | |
|---|---|---|---|
| 2010/0098514 A1* | 4/2010 | Silva | F16B 37/0828 |
| | | | 411/427 |
| 2011/0227322 A1* | 9/2011 | Nakamura | B62D 1/195 |
| | | | 280/777 |
| 2012/0267884 A1 | 10/2012 | Fujiwara et al. | |

FOREIGN PATENT DOCUMENTS

| | | | |
|---|---|---|---|
| JP | 2008-265364 A | 11/2008 | |
| JP | 2009-90684 A | 4/2009 | |
| JP | 2012-148758 A | 8/2012 | |
| KR | 100746664 B1 | 7/2007 | |
| KR | 10-0746664 B1 | 8/2007 | |

OTHER PUBLICATIONS

Communication dated Dec. 22, 2015 issued by the International Searching Authority in counterpart International Application No. PCT/JP2015/077247 (PCT/ISA/237).

* cited by examiner

STEERING COLUMN DEVICE

TECHNICAL FIELD

The present invention relates to a steering column device, and in particular, to a steering column device in which a steering column is configured to release forward from a vehicle body upon a secondary collision, together with a steering shaft.

RELATED ART

In order to absorb a shock, which is caused when an automobile collides with another automobile or the like and a driver secondarily collides with a steering wheel due to the inertia, a steering column device in which a steering column is configured to release from a vehicle body together with a steering shaft has been suggested.

In the steering column device, a structure where a vehicle body mounting bracket integrated with the steering column is fixed to the vehicle body via a so-called capsule and the vehicle body mounting bracket is to be released by a shock load upon the secondary collision has been adopted.

Patent Document 1 discloses a structure where a vehicle body mounting bracket is formed with a substantially U-shaped notch groove opening rearward of a vehicle body and having a narrow width of the opening end portion, a bush (6) configuring a capsule is fitted to an inner surface of the notch groove, and the bush (6) is sandwiched by a collar (7) and a ring (8) and is mounted to the vehicle body mounting bracket, which is then fixed to the vehicle body and is to release from the vehicle body by a predetermined load.

Also, as other forms of the capsule, Patent Document 2 discloses a washer (7) coated with a synthetic resin film of low friction containing a solid lubricant, and Patent Document 3 discloses a configuration where two sliding plates are overlapped.

In the meantime, numbers in the parentheses indicate reference numerals indicated in each of Patent Documents.

The capsule of the steering column device disclosed in Patent Document 1 is applied with a frictional force, which is to be caused when the vehicle body mounting bracket is sandwiched by the collar (7) and the ring (8), in addition to a release load with which the bush (6) is to release from the notch groove of the vehicle body mounting bracket. Therefore, in order to reduce the release load, it is necessary to strictly mange dimensional precision of the bush. Also, like the capsule of the steering column device disclosed in Patent Document 2 and Patent Document 3, according to the configuration where the washer (7) coated with the synthetic resin of low friction or the sliding plate is used, when the release load from the vehicle body is reduced, the fixing to the vehicle body becomes unstable. Therefore, it is necessary to strictly limit an allowable range of tightening torque of a bolt.

Patent Document 1: Japanese Patent Application Publication No. 2008-265364A
Patent Document 2: Japanese Utility Model Examined Publication No. S56-25981U
Patent Document 3: Japanese Utility Model No. 2,580,481B

SUMMARY OF THE INVENTION

Problems to be Solved

It is therefore an object of the present invention to provide a steering column device where a release load can be easily adjusted to be low, a variation in the release load is small and a capsule enabling a vehicle body mounting bracket to be easily mounted to a vehicle body is provided.

Means for Solving Problems

The above object is accomplished by following configurations.

That is, a steering column device of the present invention includes a steering shaft capable of mounting a steering wheel to a vehicle body rear side, a steering column configured to rotatably pivotally support the steering shaft, and a vehicle body mounting bracket having a flange part, which has a notch groove formed thereon and opening towards the vehicle body rear side, and integrally provided with the steering column, wherein the vehicle body mounting bracket is configured to support the steering column to the vehicle body by fixing of the flange part to the vehicle body and to move towards a vehicle body front side and to release from the vehicle body together with the steering column upon a secondary collision.

Also, the release capsule includes a sleeve having a through-hole for inserting therein a fastening member configured to fix the vehicle body mounting bracket to the vehicle body and to be arranged in the notch groove, a sliding plate having a hole formed therein, in which the sleeve is to be inserted, and configured to sandwich the vehicle body mounting bracket, and an fixing part and a lock member each provided at an end portion and the other end portion of the sleeve so as to sandwich the sliding plate and the vehicle body mounting bracket. The sliding plate and the vehicle body mounting bracket are sandwiched by the fixing part and the lock member, so that the sliding plate is adjusted to have a desired release load.

Particularly, in the steering column device of the present invention, the sleeve has a male screw formed on a cylindrical part thereof and is configured to be screwed with a female screw formed at a round hole of the lock member, and the desired release load is adjusted by tightening torque of the lock member.

Also, the through-hole of the sleeve may be configured as a socket for inserting therein a fastening tool.

Also, an outer diameter of the lock member may be provided with a concave part for inserting therein a fastening tool.

Also, the fixing part of the sleeve may be a clip plate configured to be fitted to a groove provided at the cylindrical part.

Also, the fixing part of the sleeve may be a flange provided at an end portion of the cylindrical part.

Also, the sliding plate may be coated with a synthetic resin film of low friction on a contact surface with the vehicle body mounting bracket.

Also, the sliding plate may be configured by an outer sliding plate of which an inner surface is coated with a synthetic resin film of low friction and an inner sliding plate of which an outer surface is coated with a synthetic resin film of low friction, and the synthetic resin films of low friction may be configured to face each other.

Also, the lock member may be provided with a protrusion provided at a tip end of the cylindrical part and have a loosening prevention mechanism configured to suppress rotation of the lock member.

Effects of the Invention

In the steering column device of the present invention, the sliding plate and the vehicle body mounting bracket are sandwiched by the sleeve and the lock member, the sliding plate is adjusted in advance to have a desired release load, and then the fastening member is inserted to the sleeve to fix the vehicle body mounting bracket to the vehicle body, so that it is not necessary to change the tightening torque of the fastening member and it is possible to adjust the capsule release load to a desired value. Thereby, the tightening torque of the fastening member does not influence the release load of the capsule, and a variation in the release load of the capsule caused due to the variation in the tightening torque of the fastening member is prevented, so that the release load can be set low. Also, the sliding plate coated with the synthetic resin film of low friction is used, so that it is possible to lower a frictional coefficient of the contact surface between the vehicle body mounting bracket and the release capsule and to effectively suppress the variation in the release load.

DETAILED DESCRIPTION OF EMBODIMENTS

Figure 1:
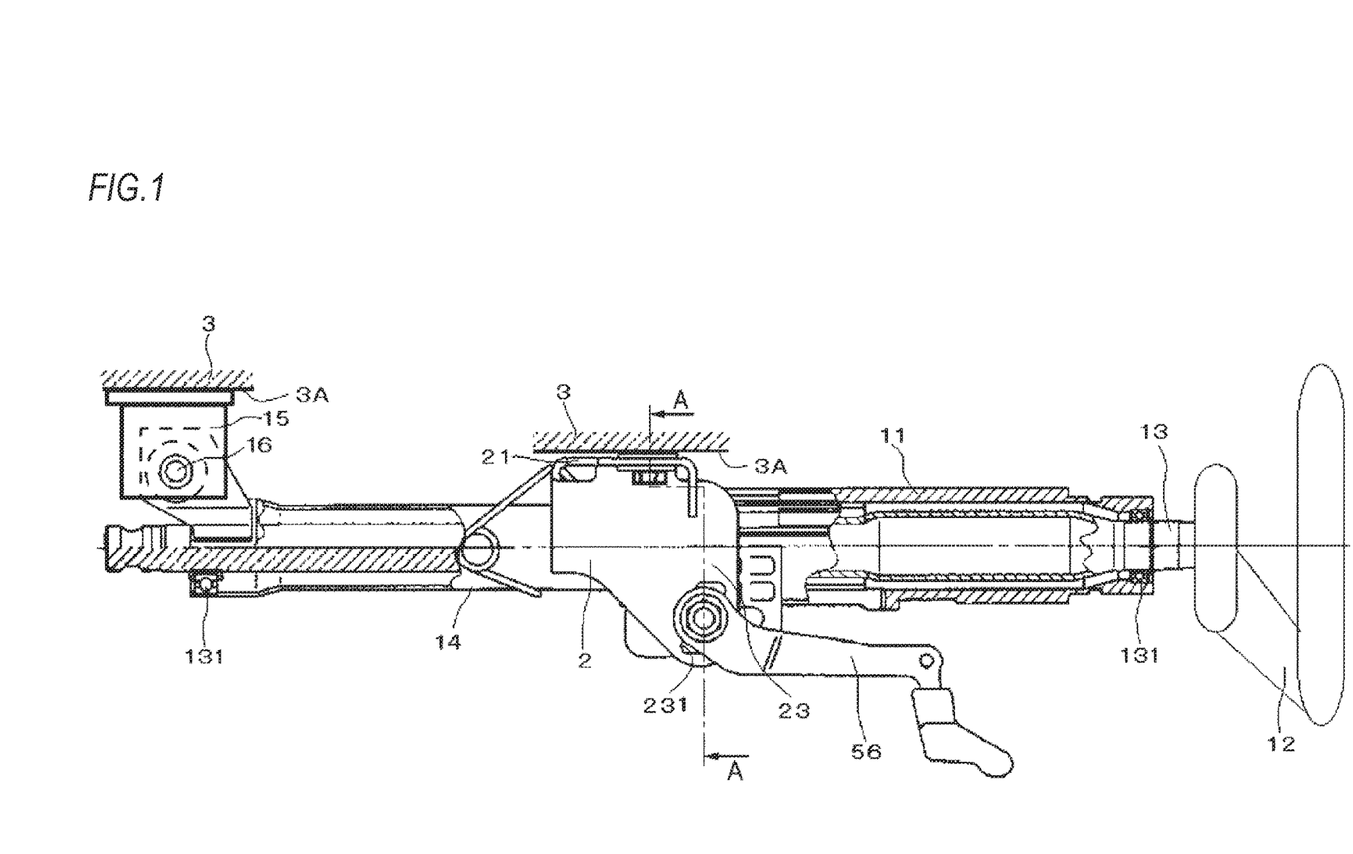
FIG. 1 is an overall side view of a steering column device of the present invention.
Figure 2:
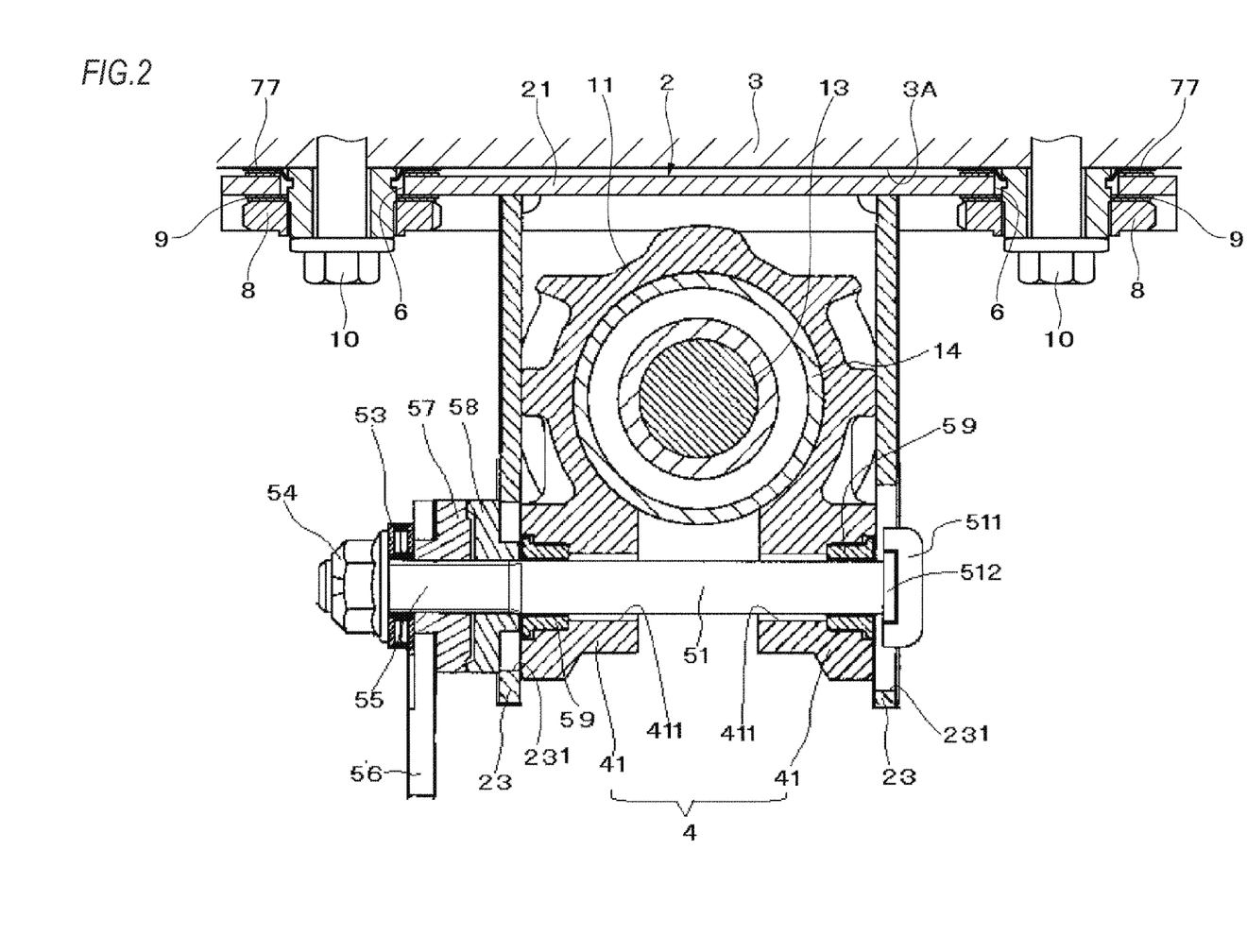
FIG. 2 is a sectional view taken along a line A-A of FIG. 1.
Figure 3:
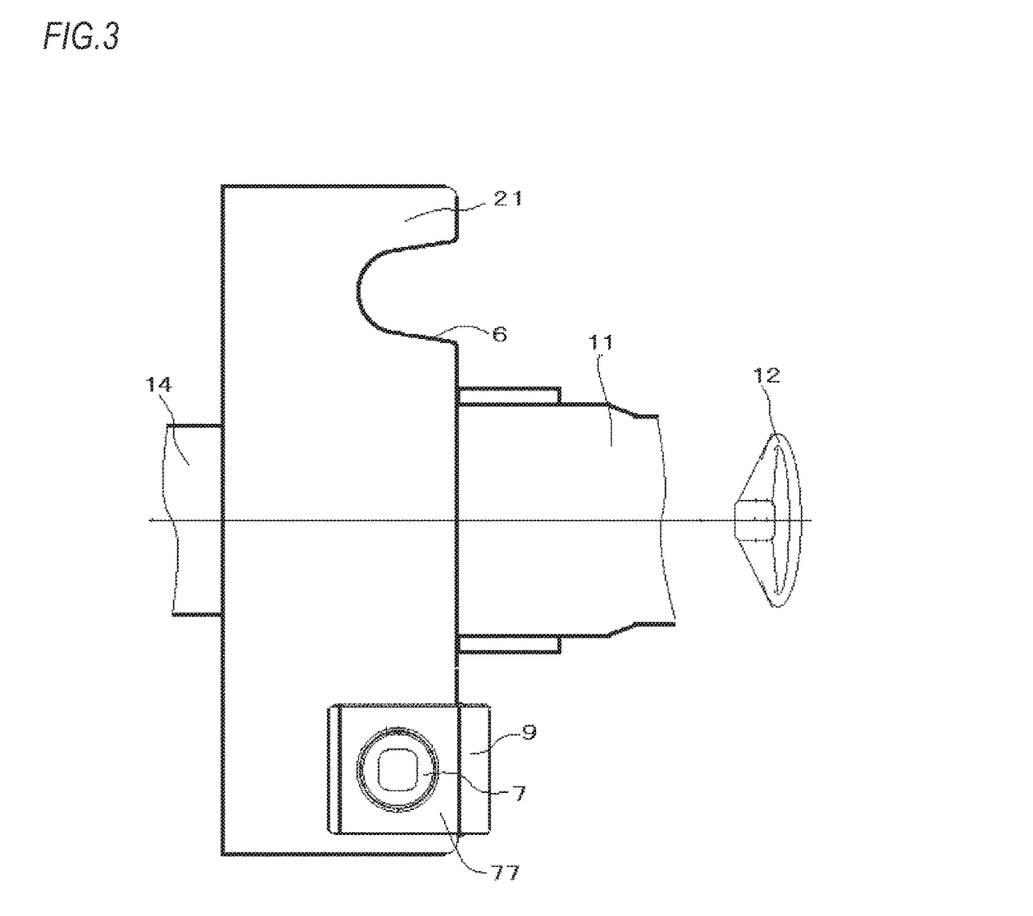
FIG. 3 is a plan view depicting an upper-side vehicle body mounting bracket of FIG. 1, in which one capsule is omitted.
Figure 4:
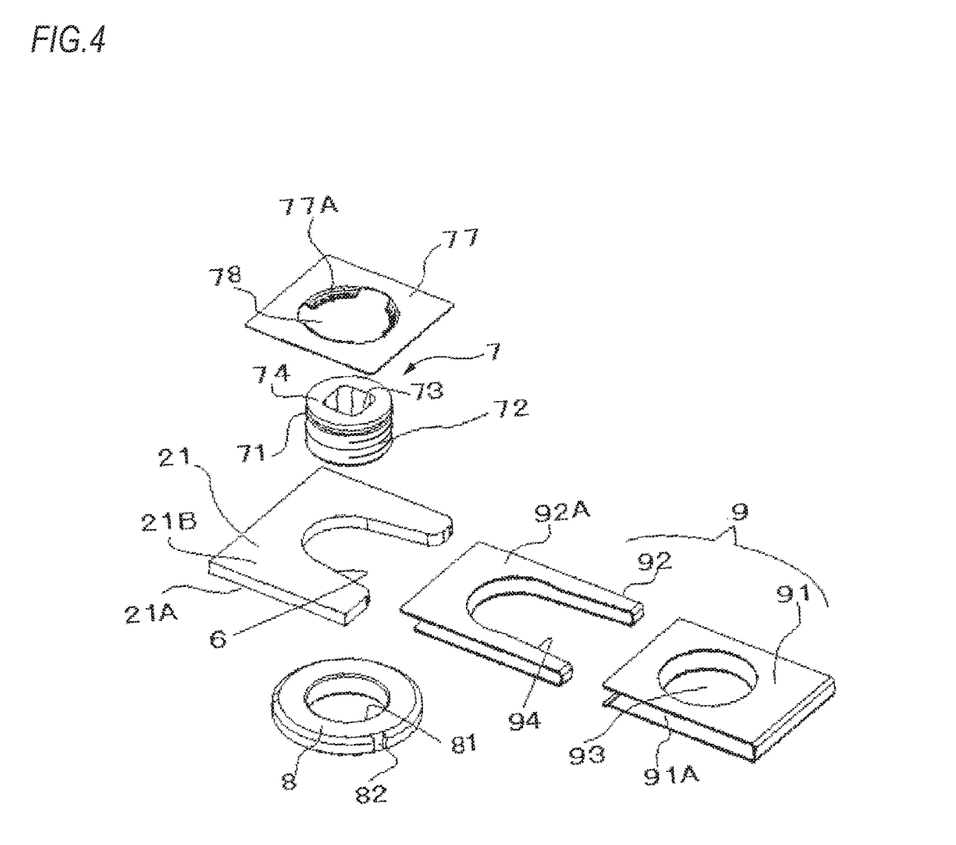
FIG. 4 is an exploded perspective view of a capsule of a first embodiment of the present invention.
Figure 5:
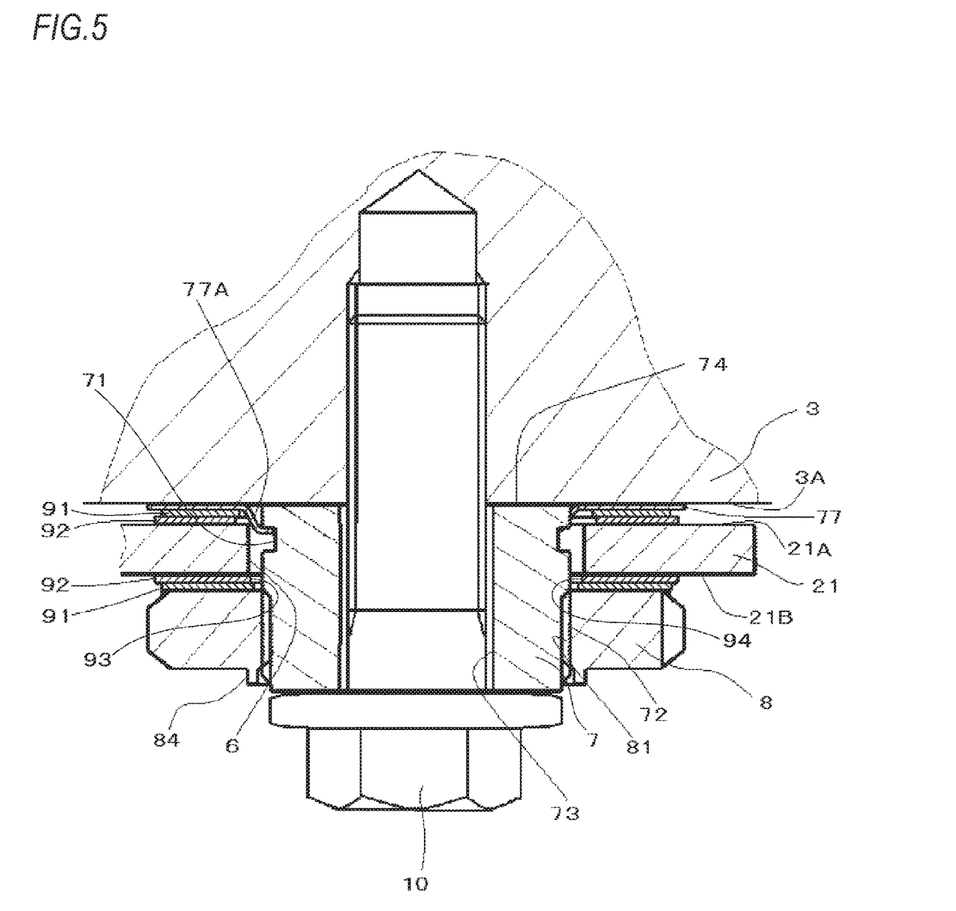
FIG. 5 is a sectional view of the capsule of the first embodiment of the present invention, depicting a state after an fixing bolt is fastened.

Hereinafter, embodiments of the present invention will be described with reference to the drawings. FIG. 1 is an overall side view of a steering column device of the present invention, FIG. 2 is a sectional view taken along a line A-A of FIG. 1. FIG. 3 is a plan view depicting an upper-side vehicle body mounting bracket of FIG. 1, in which one capsule is omitted, FIG. 4 is an exploded perspective view of a capsule of a first embodiment of the present invention. FIG. 5 is a sectional view of the capsule shown in FIG. 4, depicting a state after a bolt is fastened.

FIGS. 1 to 3 depict an embodiment where the present invention is applied to a tilt and telescopic steering column device. A steering shaft 13 having a steering wheel 12 mounted to a vehicle body rear side is rotatably pivotally supported to an inner diameter part of an outer column 11 by bearings 131, 131. The outer column 11 is externally fitted to an inner column 14 so as to be axially moveable. At a vehicle body front side of the inner column 14, a lower-side vehicle body mounting bracket 15 is tiltably pivotally supported to a vehicle body 3 by a pivot pin 16.

In the meantime, the outer column 11 and the inner column 14 configure the steering column of the present invention.

The outer column 11 is provided at its lower side with a distance bracket 4. Right and left held parts 41, 41 of the distance bracket 4 are sandwiched at an inner side relative to right and left side plates 23, 23 of an upper-side vehicle body mounting bracket 2. A flange part 21 extending in a right and left direction is integrally provided at upper ends of the side plates 23, 23, and the flange part 21 is mounted to the vehicle body 3.

The side plates 23, 23 are formed with long holes for tilt 231, 231. The long holes for tilt 231, 231 have a circular arc of which a center is the pivot pin 16, respectively. The right and left held parts 41, 41 of the distance bracket 4 are formed with telescopic long holes 411, 411 for telescopic adjustment in the right and left direction of FIG. 2.

A fastening rod 51 having a round rod shape is inserted from a right side of FIG. 2 through the long holes for tilt 231, 231 and the telescopic long holes 411, 411. A right end of the fastening rod 51 is formed with a cylindrical head part 511, and a right outer diameter part of the head part 511 is formed with a rotation stop part 512 having a rectangular section of which a width is slightly narrower than a groove width of the long hole for tilt 231. The rotation stop part 512 is fitted in the long hole for tilt 231, and is configured to stop rotation of the fastening rod 51 relative to the upper-side vehicle body mounting bracket 2 and to slide the fastening rod 51 along the long hole for tilt 231 upon adjustment of a tilt position.

In the meantime, outer openings of the telescopic long holes 411, 411 in a vehicle width direction are mounted with sleeves 59, 59 having a long hole shape to which the fastening rod 51 is to be loosely fitted.

A stationary cam 58, a moveable cam 57, an operating lever 56, a thrust bearing 53 and an adjusting nut 54 are sequentially externally fitted to an outer periphery of a left end of the fastening rod 51, and a female screw formed on an inner diameter part of the adjusting nut 54 is screwed to a male screw 55 formed on the left end of the fastening rod 51.

The operating lever 56 is fixed to a left end surface of the moveable cam 57. By the operating lever 56, it is possible to clamp the right and left held parts 41, 41 of the distance bracket 4 with a cam mechanism configured by the moveable cam 57 and the stationary cam 58 and the held parts 41, 41 can also clamp the inner column 14.

Upon a clamping, when the operating lever 56 is rotated, a cam thread provided on a right end surface of the moveable cam 57 and a cam thread provided on a left surface of the stationary cam 58 run on each other by the operating lever 56, and the fastening rod 51 is pulled leftwards to fasten the side plates 23, 23, so that an interval between the right and left held parts 41, 41 of the distance bracket 4 is narrowed to clamp the inner column 14.

Upon an unclamping, the operating lever 56 is rotated in an opposite direction, phases of both the cam threads of the moveable cam 57 and the stationary cam 58 are offset, so that bracing of the cam mechanism is released and the force of pulling leftward the fastening rod 51 is released. Thereby, the side plates 23, 23 are spaced from each other, so that the fastening of the right and left held parts 41, 41 of the distance bracket 4 and the force of the held parts 41, 41 fastening the inner column 14 are released.

As shown in FIG. 3, the flange part 21 is formed with notch grooves 6, 6 having a substantial U shape opening towards the vehicle body rear side (a right side in FIG. 3). The flange part 21 is detachably mounted to the vehicle body 3 by using the notch grooves 6, 6.

Figure 6:
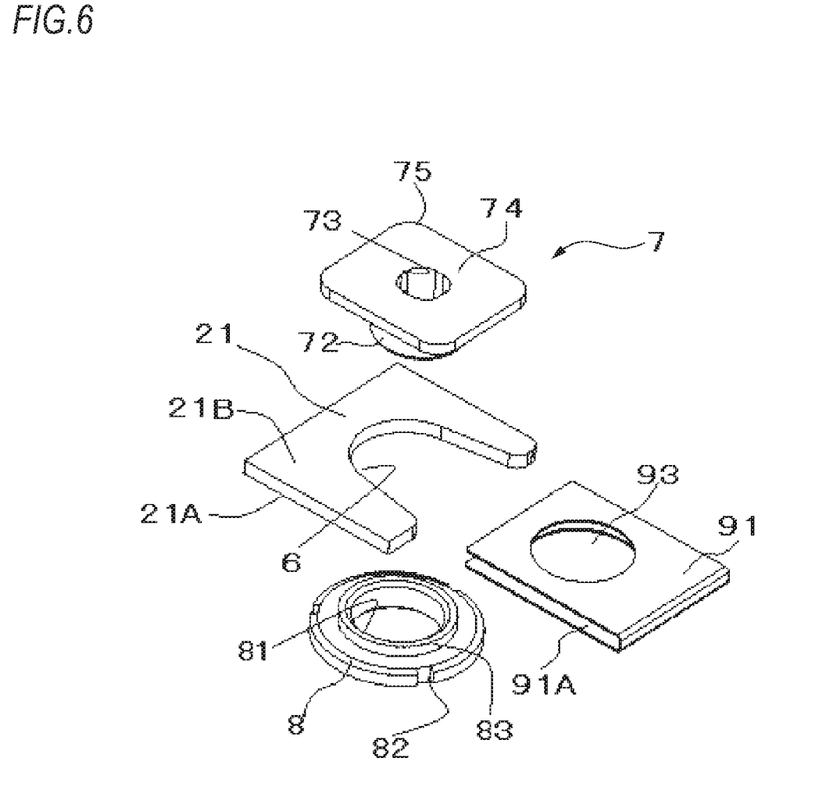
FIG. 6 is an exploded perspective view of a capsule of a second embodiment of the present invention.

FIGS. 4 to 6 depict a first embodiment of a method of mounting the flange part 21 of one side to the vehicle body 3. A method of mounting the flange part of the other side to the vehicle body 3 is the same as the method of mounting one flange part 21 to the vehicle body 3.

FIGS. 4 and 5 depict in detail a capsule of the first embodiment. A release capsule configured to mount the flange part 21 to the vehicle body 3 is configured by a sleeve 7, a clip plate 77, which is an example of the fixing part, a lock member 8 and a sliding plate 9.

The sleeve 7 is formed of a conductive material, and has a cylindrical part 72 having a male screw and a groove 71 provided on an outer periphery of an end portion of the cylindrical part 72, and an through-hole 73 for inserting therein an fixing bolt 10 is formed at a shaft center of the cylindrical part 72. As a material of the sleeve 7, low carbon steel, aluminum, magnesium or the like can be used. However, the material preferably has hardness lower than a material of the lock member 8. The sleeve 7 is a column configured to insert the cylindrical part 72 in a part at which a round hole 93 of an outer sliding plate 91 of the sliding plate 9, a notch groove 94 of an inner sliding plate 92 and the notch groove 6 of the flange part 21 overlap each other, and to sandwich the sliding plate 9 and the flange part 21 by the clip plate 77 mounted to the groove 71 and the lock member 8 to be screwed to the cylindrical part 72. Also, the through-hole 73 is configured as a socket for inserting therein a fastening tool and has a quadrangular shape, in the first embodiment. The through-hole 73 is not necessarily required to have the quadrangular shape and may have a well-known shape such as an oval shape, a hexagonal shape, an octagonal shape or the like.

The clip plate 77 is formed of a thin conductive plate having a thickness of about 0.3 mm to 0.8 mm by bending the thin plate with a press. The clip plate 77 is inserted between an upper surface 21B of the flange part 21 and a lower surface 3A of the vehicle body 3. The clip plate 77 is formed at a center thereof with a through-hole 78. The through-hole 78 is formed with a plurality of claws 77A, which are arranged at equal intervals on a periphery thereof and formed radially towards the center of the clip plate 77. A diameter size of a circle inscribed in inner sides of the claws 77A is formed to be slightly smaller than an outer diameter size of a groove bottom of the groove 71 of the cylindrical part 72.

Therefore, when the clip plate 77 is pushed into the cylindrical part 72 of the sleeve 7, the clip plate is fitted to the groove 71 provided at the end portion of the cylindrical part 72 with the claws 77A being enlarged radially outwards, and the inner sides of the claws 77A are bitten to the outer periphery of the groove 71 by an elastic force of the claws 77A, so that the clip plate 77 and the sleeve 7 are coupled. That is, the claws 77A have a function of a push nut.

The sliding plate 9 includes an outer sliding plate 91, which is formed by bending a thin conductive plate having a thickness of about 0.3 mm to 0.8 mm into a U-shape and has a coated surface 91A coated on an inner side thereof with a low friction material made of a synthetic resin film of low friction, and an inner sliding plate 92, which is formed by bending a thin conductive plate having a thickness of about 0.3 mm to 0.8 mm into a U-shape and has a coated surface 92A coated on an outer side thereof with the same low friction material. The inner sliding plate 92 is fitted to the outer sliding plate 91 so that the coated surface 91A and the coated surface 92A face each other.

The outer sliding plate 91 is formed at its central part with a round hole 93 through which the sleeve 7 is to pass, and the inner sliding plate 92 is formed with a substantially U-shaped notch groove 94 of which one side is opened and through which the sleeve 7 is to pass. The notch groove 94 has the same shape as the notch groove 6 of the flange part 21.

The lock member 8 is a circular lock nut, and a round hole 81 of an inner diameter part thereof is formed with a female screw and is screwed to the male screw of the cylindrical part 72 of the sleeve 7. Also, an outer diameter of the lock member 8 is formed with a concave part 82, and the fastening tool is mounted and screw-fastened thereto. The concave part 82 is not necessarily required to be a groove, and an outward shape thereof may be a well-known shape such as a hexahedral shape.

Meanwhile, in FIG. 5, an end surface of the lock member 8 is formed with a protrusion 84 protruding around the round hole 81. However, in the first embodiment, the protrusion 84 may not be provided.

As shown in FIG. 5, at a state where the inner sliding plate 92 and the outer sliding plate 91 are mounted around the notch groove 6 of the flange 21, the sleeve 7 having the clip plate 77 mounted thereto passes through the round hole 93, the notch groove 94 and the notch groove 6, and the lock member 8 is screwed to the sleeve 7, so that the release capsule of the first embodiment is fixed to the flange 21. Also, at this state, the fixing bolt 10 passes through the through-hole 73 and is fastened to the vehicle body 3, so that the steering column device is mounted to the vehicle body. In the meantime, as the fastening member, a well-known member such as a stud bolt and a nut can also be used, instead of the fixing bolt 10.

When a secondary collision occurs, the release capsule is released from the flange 21 due to a shock upon the secondary collision. At this time, at a state where the fixing bolt 10 remains at the vehicle body 3 with the lock member 8, the sleeve 7, the outer sliding plate 91 and the clip plate 77 being mounted thereto and the inner sliding plate 92 is kept with being mounted to the flange 21, the steering device moves toward the front of the vehicle.

Therefore, the flange part 21 is fixed to the vehicle body 3, so that the upper-side vehicle body mounting bracket 2 supports the steering column to the vehicle body 3, and when the secondary collision occurs, the upper-side vehicle body mounting bracket moves toward the vehicle body front side and can thus release from the vehicle body 3 together with the steering column.

While the release capsule usually requires an fixation force by which the steering column device does not rattle so that the steering wheel 12 can be operated, a low release load is required so as to reduce a damage when a driver collides with the steering wheel 12. Therefore, an allowable range of the release load is necessarily required to be narrow.

In the first embodiment, after the sliding plate 9 is overlapped so that the coated surface 91A of the outer sliding plate 91 and the coated surface 92A of the inner sliding plate 92 face each other, the female screw of the round hole 81 of the lock member 8 is screwed to the male screw of the cylindrical part 72 of the sleeve 7 having the clip plate 77 fixed thereto, so that the tightening torque of the lock member 8 is adjusted to a desired value to set the release load of the capsule. The coated surface 91A and the coated surface 92A are arranged to face each other, so that it is possible to lower a frictional coefficient of a sliding surface upon the release and to effectively suppress a variation in the tightening torque of the lock member 8.

Also, regarding a fastening axial force of the fixing bolt 10, a fastening seat surface of a head part of the fixing bolt 10 is closely contacted to the sleeve 7 to press an upper end surface 74 of the sleeve 7 to the lower surface 3A of the vehicle body 3, so that the axial force is entirely used to fix the flange 21 through the capsule. Therefore, the seat surface of the head part of the fixing bolt 10 does not press the sliding plate 9, so that it is possible to make a difference between a force of pressing the sliding plate 9 and a force of fixing the flange 21 to the vehicle body, and the tightening torque of the fixing bolt 10 does not affect the release load, so that it is not necessary to make a difference between the tightening torque of mounting the steering device to the vehicle and the tightening torque of mounting the other component to the vehicle body without. Thereby, it is possible to easily mount the steering device to the vehicle body.

Subsequently, a second embodiment of the present invention is described. FIG. 6 is an exploded perspective view of a capsule in accordance with the second embodiment of the present invention. In below descriptions, only parts different from the first embodiment are described, and the overlapping descriptions are omitted. In the second embodiment, instead of the clip plate 77 of the first embodiment, an end portion of the sleeve 7 is formed with a large-diameter flange part 75 becoming the fixing part, the sliding plate 9 is configured only by one component of the outer sliding plate 91, and an end portion of the lock member 8 is provided with a cylindrical part 83 to be fitted to the round hole 93.

When the allowable range of the release load can be widened, only one component of the outer sliding plate 91 can be provided. It may also be used by changing the combination with the sleeve 7, the lock member 8 and the clip plate 77 of the first embodiment.

The cylindrical part 83 provided at the end portion of the lock member 8 is fitted with the round hole 93 so as to prevent the sliding plate 9 from being deformed due to the friction of the seat surface upon the fastening of the lock member 8. Also, the cylindrical part 83 is fitted with the notch groove 6 so that a positional deviation is to be prevented even though the capsule is applied with a shock resulting from an external force before the capsule is mounted to the vehicle. The lock member 8 of the second embodiment may be used by changing the combination with the sleeve 7 and the clip plate 77 of the first embodiment.

Figure 7:
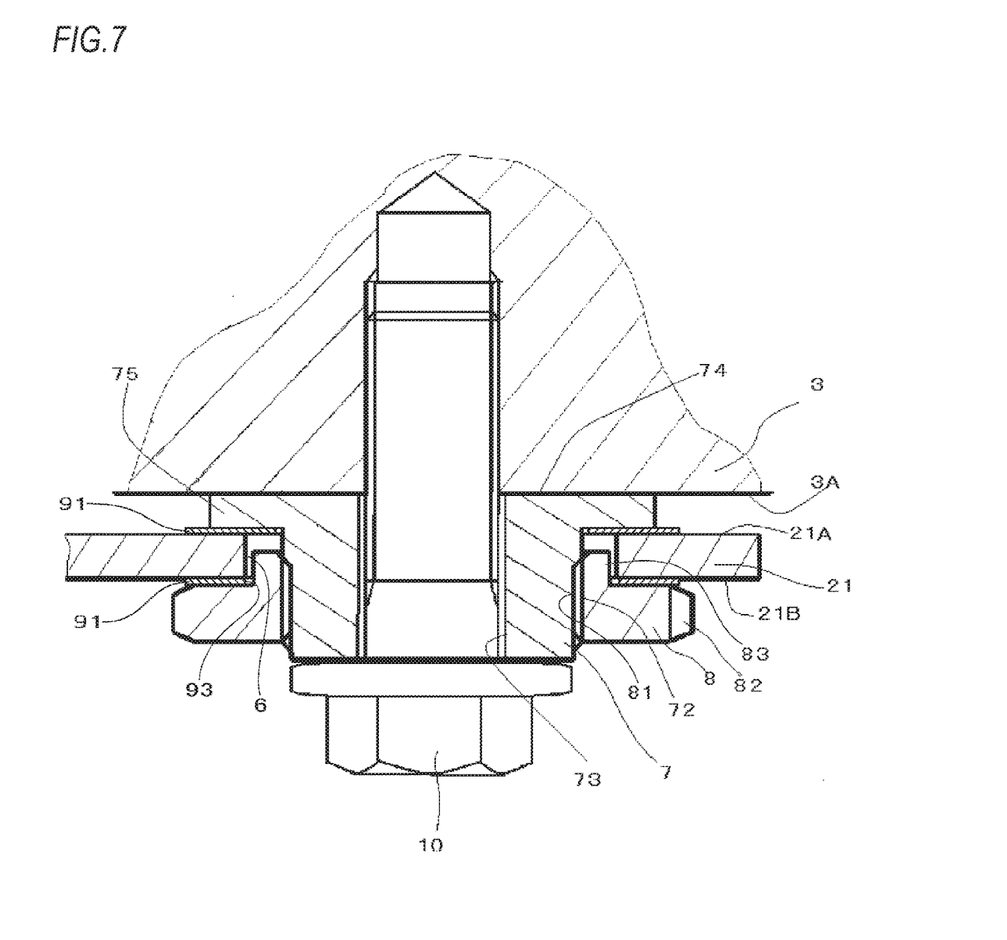
FIG. 7 is a sectional view of the capsule of the second embodiment of the present invention, depicting a state after the fixing bolt is fastened.

The large-diameter flange part 75 provided at the end portion of the sleeve 7 sandwiches the sliding plate 9 and the flange 21 between the large-diameter flange part 75 and the lock member 8, like the clip plate 77 of the first embodiment, and the fixing bolt 10 passes through the through-hole 73 of the sleeve 7 and is fastened to the vehicle body 3, so that the steering column device is mounted to the vehicle body. The large-diameter flange part 75 is integrally formed, so that it is possible to simplify the components and to easily perform the mounting operation. The large-diameter flange part 75 is formed to be thick, so that it is possible to improve the mounting rigidity of the flange 21. The sleeve 7 of the second embodiment may be used by changing the combination with the lock member 8 and the sliding plate 9 of the first embodiment.

Figure 8:
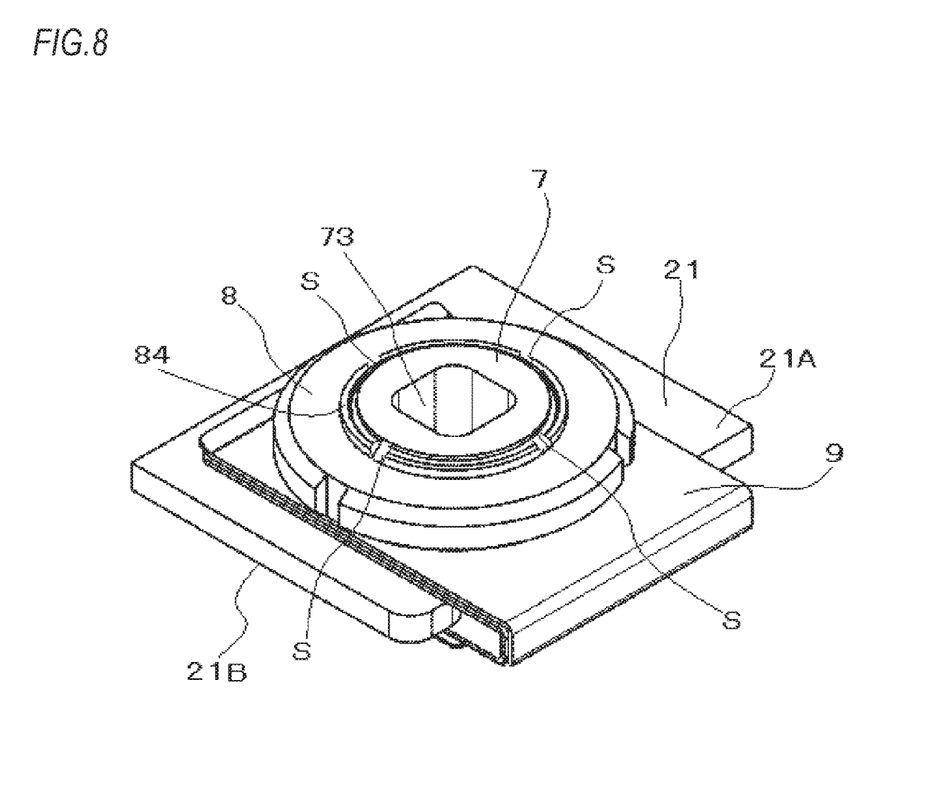
FIG. 8 is a perspective view of a capsule of a third embodiment of the present invention, as seen from rear.

Subsequently, a third embodiment of the present invention is described. FIG. 8 is a perspective view of a capsule in accordance with the third embodiment of the present invention. In below descriptions, only parts different from the first embodiment are described, and the overlapping descriptions are omitted. In the third embodiment, an end portion of the lock member 8 is provided with caulking portions S.

The caulking portion S is a so-called loosening prevention mechanism for suppressing rotation of the lock member 8, which is formed by screwing the lock member 8 to the sleeve 7 with desired tightening torque and deforming the protrusion 84 (refer to FIG. 5) protruding from an end surface of the lock member 8 with a tool, and is configured to suppress the loosening of the capsule, which is caused when the capsule is applied with the shock resulting from the external force before the capsule is mounted to the vehicle or is caused due to traveling vibrations after the capsule is mounted to the vehicle.

In addition to the third embodiment, the caulking portion S may be formed using a well-known method of deforming the outer diameter of the cylindrical part 72 of the sleeve 7, for example. Also, the protrusion 84 may be deformed in advance and screwed to the sleeve 7. Also, a loosening prevention member, which is to be deformed by the screwing, may be mounted to the round hole 81 and the cylindrical part 72 may be applied with an adhesive material.

In the meantime, the present invention is not limited to the above embodiments and can be appropriately modified and improved.

In the above embodiments, the release load may be adjusted by applying a lubricant to the coated surface 91A or the coated surface 92A. Also, the materials of the outer sliding plate 91 and the inner sliding plate 92 can be replaced with non-iron metal, synthetic resin or the like within a range of satisfying the release load and the temporal holding function.

The release load may be adjusted to be higher when a utility is different.

The subject application is based on a Japanese Patent Application No. 2014-224243 filed on Nov. 4, 2014, which is herein incorporated by reference.

DESCRIPTION OF REFERENCE NUMERALS

10: fixing bolt, 11: outer column, 12: steering wheel, 13: steering shaft, 14: inner column, 15: lower-side vehicle body mounting bracket, 16: pivot pin, 2: upper-side vehicle body mounting bracket, 21: flange part, 21A: lower surface, 21B: upper surface, 23: side plate, 231: long hole for tilt, 3: vehicle body, 3A: lower surface, 4: distance bracket, 41: held part, 411: long hole 51: fastening rod, 511: head part, 512: rotation stop part, 53: thrust bearing, 54: adjusting nut, 55: male screw, 56: operating lever, 6: notch groove 7: sleeve, 71: groove, 72: cylindrical part, 73: through-hole, 74: upper end surface, 75: large-diameter flange part, 77: clip plate, 77A: claw, 78: through-hole, 8: lock member, 81: round hole, 82: concave part, 83: cylindrical part, 84: protrusion, 9: sliding plate, 91: outer sliding plate, 91A: coated surface, 92: inner sliding plate, 92A: coated surface, 93: round hole, 94: notch groove

The invention claimed is:
1. A steering column device comprising:
  a steering shaft capable of mounting a steering wheel to a vehicle body rear side;
  a steering column configured to rotatably pivotally support the steering shaft;
  a vehicle body mounting bracket having a flange part, which has a notch groove formed thereon and opening towards the vehicle body rear side, and integrally provided with the steering column; and
  a release capsule configured to releasably fix the vehicle body mounting bracket to the vehicle body,
  wherein the vehicle body mounting bracket is configured to support the steering column to the vehicle body by fixing of the flange part to the vehicle body and to move towards a vehicle body front side and to release from the vehicle body together with the steering column upon a secondary collision, and wherein the release capsule comprises:
- a sleeve having a through-hole for inserting therein a fastening member configured to fix the vehicle body mounting bracket to the vehicle body and to be arranged in the notch groove;
- a sliding plate having a hole formed thereon, in which the sleeve is to be inserted, and configured to sandwich the vehicle body mounting bracket; and
- a fixing part and a lock member each provided at an end portion and the other end portion of the sleeve so as to sandwich the sliding plate and the vehicle body mounting bracket, wherein the sleeve comprises a male screw formed on a cylindrical part thereof, wherein the male screw of the sleeve is configured to be screwed with a female screw formed at a round hole of the lock member, wherein the sliding plate and the vehicle body mounting bracket are sandwiched by the fixing part and the lock member with the fixing part being disposed on a near side of the vehicle body and the locking member being disposed on an opposite, far, side thereof further from the vehicle body, and wherein the fixing part is in contact with the vehicle body.

2. The steering column device according to claim 1,
wherein the through-hole of the sleeve is configured as a socket for inserting therein a fastening tool.

3. The steering column device according to claim 1,
wherein an outer diameter of the lock member is provided with a concave part for inserting therein a fastening tool.

4. The steering column device according to claim 1,
wherein the fixing part of the sleeve is a clip plate configured to be fitted to a groove provided at the cylindrical part.

5. The steering column device according to claim 1,
wherein the fixing part of the sleeve is a flange provided at an end portion of the cylindrical part.

6. The steering column device according to any one of claim 1,
wherein the sliding plate is coated with a synthetic resin film of low friction on a contact surface with the vehicle body mounting bracket.

7. The steering column device according to any one of claim 1,
wherein the sliding plate is configured by an outer sliding plate of which an inner surface is coated with a synthetic resin film of low friction and an inner sliding plate of which an outer surface is coated with a synthetic resin film of low friction, and the synthetic resin films of low friction are configured to face each other.

8. The steering column device according to any one of claim 1,
wherein the lock member is provided with a protrusion provided at a tip end of the cylindrical part and has a loosening prevention mechanism configured to suppress rotation of the lock member.

9. The steering column device according to claim 1,
wherein the cylindrical part is provided at an end portion of the lock member.

* * * * *